United States Patent
Shibata et al.

(10) Patent No.: US 11,269,511 B2
(45) Date of Patent: Mar. 8, 2022

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Hirohito Shibata, Kanagawa (JP); Xingya Xu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 153 days.

(21) Appl. No.: 16/197,374

(22) Filed: Nov. 21, 2018

(65) Prior Publication Data

US 2019/0171352 A1    Jun. 6, 2019

(30) Foreign Application Priority Data

Dec. 1, 2017    (JP) .............................. JP2017-231834

(51) Int. Cl.
| | |
|---|---|
| *G06F 3/0488* | (2013.01) |
| *G06F 3/04883* | (2022.01) |
| *G06F 3/04817* | (2022.01) |
| *G06K 9/00* | (2022.01) |
| *G06F 3/16* | (2006.01) |
| *G06F 3/0354* | (2013.01) |

(52) U.S. Cl.
CPC ........ *G06F 3/04883* (2013.01); *G06F 3/0354* (2013.01); *G06F 3/04817* (2013.01); *G06F 3/167* (2013.01); *G06K 9/00335* (2013.01); *G06K 9/00402* (2013.01)

(58) Field of Classification Search
CPC .................................................. G06F 3/04883
See application file for complete search history.

(56) References Cited

U.S. PATENT DOCUMENTS

| | | | | |
|---|---|---|---|---|
| 2009/0251441 | A1* | 10/2009 | Edgecomb | ......... G06F 3/04883 345/179 |
| 2012/0092268 | A1* | 4/2012 | Tsai | .................... G06F 3/04883 345/173 |

(Continued)

FOREIGN PATENT DOCUMENTS

| | | |
|---|---|---|
| JP | H0863319 | 3/1996 |
| JP | 2000047824 | 2/2000 |

(Continued)

OTHER PUBLICATIONS

Office Action of Japan Counterpart Application, with English translation thereof, dated Oct. 5, 2021, pp. 1-5.

*Primary Examiner* — Pei Yong Weng
(74) *Attorney, Agent, or Firm* — JCIPRNET

(57) ABSTRACT

An information processing apparatus includes a reception unit, a recognition unit, an extraction unit, and a processing unit. The reception unit receives drawing information which is information on a drawing operation by a user. The recognition unit recognizes whether or not a last part of the drawing operation is a gesture which the user designates a command, based on the drawing information. The extraction unit extracts a type of a figure drawn by the user before the user performs the gesture. The processing unit performs a process based on the extracted type of the figure.

18 Claims, 11 Drawing Sheets

(56) References Cited

U.S. PATENT DOCUMENTS

| | | | |
|---|---|---|---|
| 2013/0290911 A1* | 10/2013 | Praphul | G06F 3/017 |
| | | | 715/863 |
| 2014/0002379 A1* | 1/2014 | Hsieh | G06F 3/04883 |
| | | | 345/173 |
| 2015/0032460 A1* | 1/2015 | Kang | G06F 3/167 |
| | | | 704/276 |
| 2015/0205520 A1* | 7/2015 | Yim | G06F 3/04883 |
| | | | 715/268 |
| 2016/0154624 A1* | 6/2016 | Son | G06F 1/169 |
| | | | 704/235 |

FOREIGN PATENT DOCUMENTS

| | | |
|---|---|---|
| JP | 3258978 | 2/2002 |
| JP | 2012089123 | 5/2012 |

\* cited by examiner

FIG. 4
| DRAWING OPERATION | FIGURE TYPE | OBJECT TYPE |
|---|---|---|
| (a) 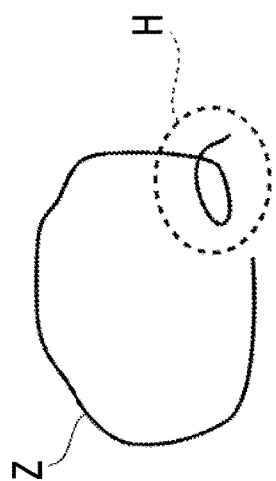 | CIRCLE ⇒ | "ICON" |
| (b) 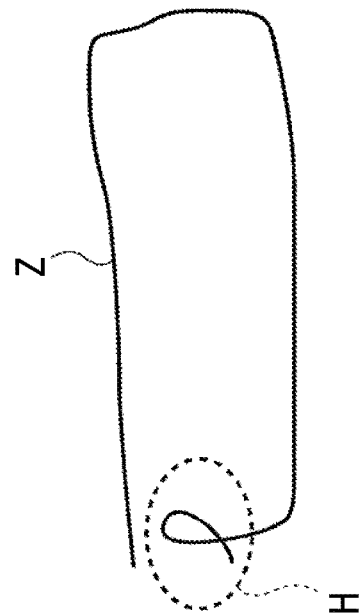 | RECTANGLE ⇒ | "BOX" |
| (c) 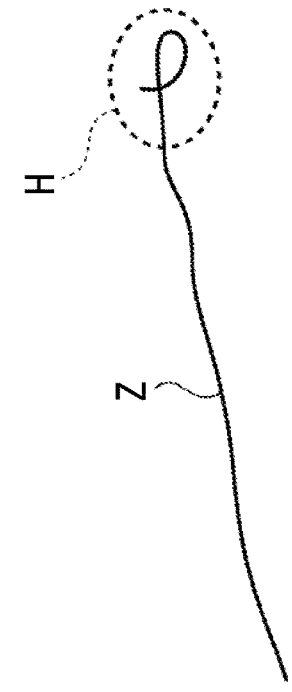 | LINE | IF START POINT AND END POINT ARE OBJECTS, "LINK" / OTHERWISE, "TEXT" |

| ATTRIBUTE | VALUE |
|---|---|
| OBJECT TYPE | BOX |
| UPPER LEFT POSITION OF RECTANGLE | (134,335) |
| VERTICAL AND HORIZONTAL SIZES OF RECTANGLE | 54×88 |
| STROKE START POSITION | (13,45) |
| STROKE END POSITION | (144,523) |

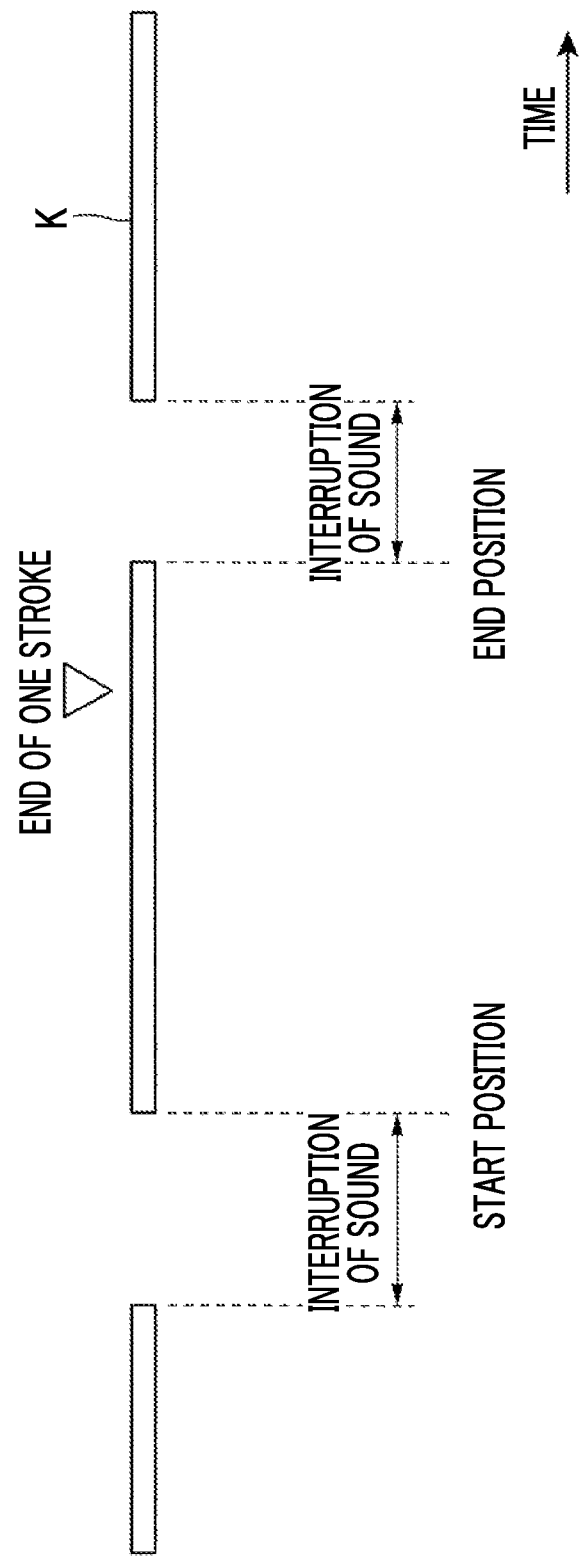

| ICON ID | ICON PATH | ICON NAME LIST |
|---|---|---|
| 1 | C:¥icon¥notepc.jpg | NOTE PC, NOTEBOOK PC, LAPTOP PC, ⋯ |
| 2 | C:¥icon¥printer.jpg | PRINTER, COLOR PRINTER, ⋯ |

| ATTRIBUTE | VALUE |
|---|---|
| SOUND TEXT | NOTE PC |
| ICON ID | 1 |

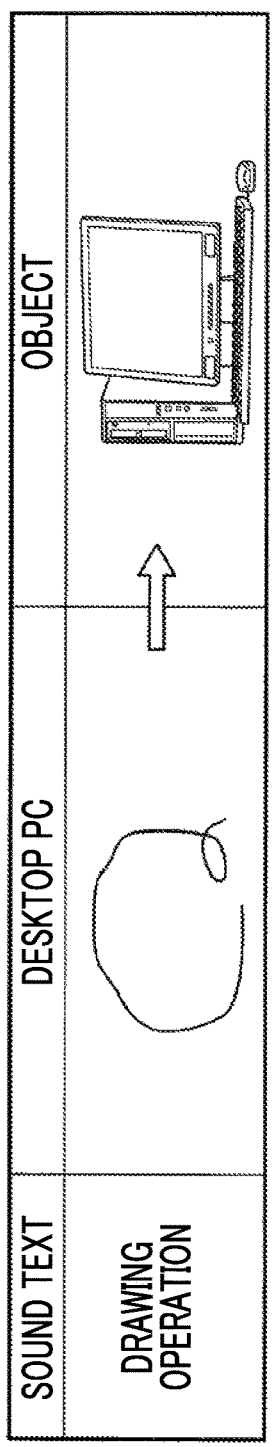
FIG. 8A ICON
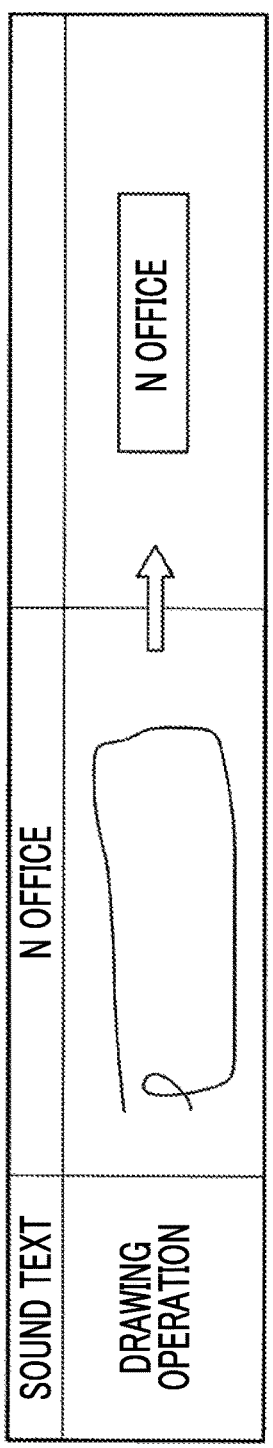
FIG. 8B BOX
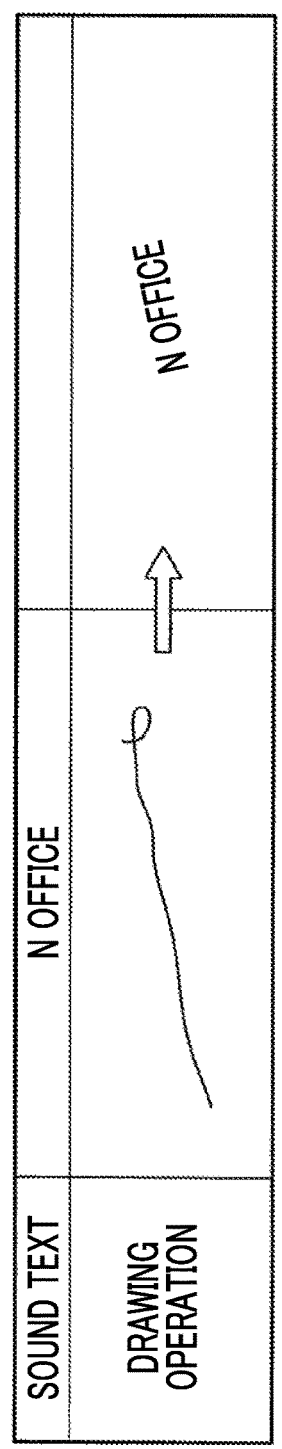
FIG. 8C TEXT
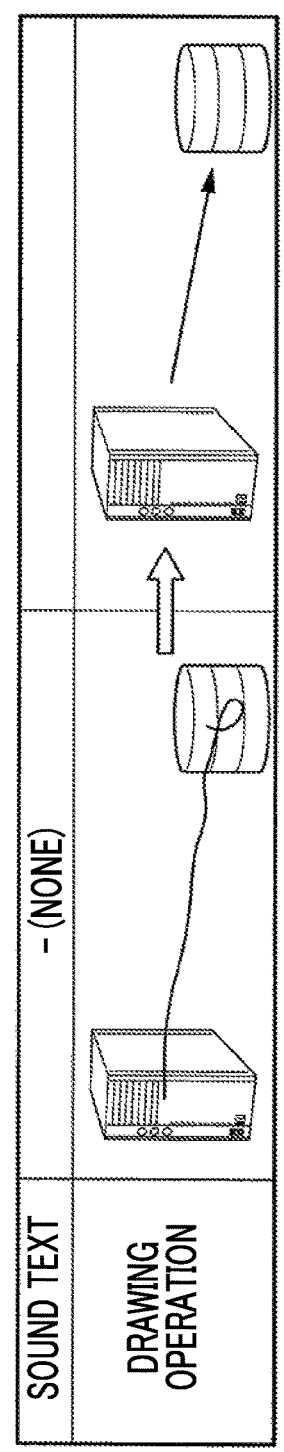
FIG. 8D LINK

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-231834 filed Dec. 1, 2017.

BACKGROUND

(i) Technical Field

The present invention relates to an information processing apparatus, an information processing system, and a non-transitory computer readable medium storing program.

(ii) Related Art

In the related art, there is an information processing apparatus to which the user inputs a command by combining plural input units such as voice and a pointing device such as a pen and a mouse, and which performs processing corresponding to the command. Each input units has been aimed to improve the speed, accuracy, recognition rate, and the like of an input. Recently, accuracy of sound recognition and handwriting recognition is improved and becomes a practical level, so an environment for performing processing using plural input units is established.

SUMMARY

According to an aspect of the invention, there is provided an information processing apparatus including a reception unit that receives drawing information which is information on a drawing operation by a user; a recognition unit that recognizes whether or not a last part of the drawing operation is a gesture which the user designates a command, based on the drawing information; an extraction unit that extracts a type of a figure drawn by the user before the user performs the gesture; and a processing unit that performs a process based on the extracted type of the figure.

BRIEF DESCRIPTION OF THE DRAWINGS

Exemplary embodiment(s) of the present invention will be described in detail based on the following figures, wherein:

FIG. 4 is a diagram showing a case where a figure extraction unit extracts a figure type of an extracted figure and further determines an object type;

FIG. 6 is a diagram showing a method of extracting sound information by a sound extraction unit;

FIG. 7A is a diagram showing an icon table, and FIG. 7B is a diagram showing text structure data;

FIGS. 8A to 8D are diagrams each showing a process in which an object conversion unit performs conversion into an object corresponding to a type of the figure;

DETAILED DESCRIPTION

Hereinafter, exemplary embodiments of the present invention will be described in detail with reference to the accompanying drawings.

Description of Entire Information Processing System

Figure 1:
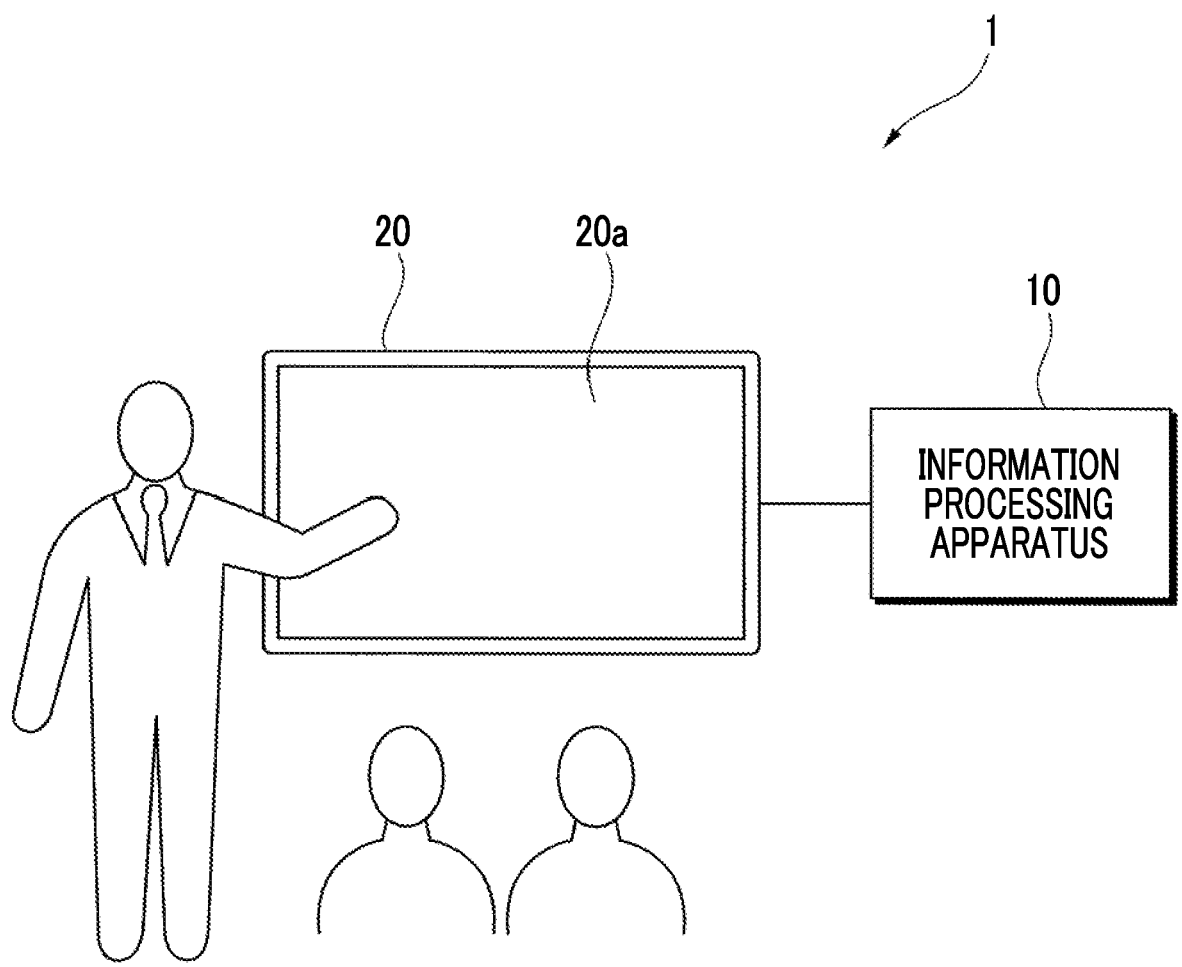
FIG. 1 is a diagram illustrating a configuration of an information processing system according to an exemplary embodiment.

FIG. 1 is a diagram illustrating a configuration example of an information processing system according to an exemplary embodiment.

As shown in FIG. 1, the information processing system 1 according to the present exemplary embodiment includes an information processing apparatus 10 that generates display information of an image to be displayed on a display device 20 based on a drawing operation by a user, and the display device 20 that receives a drawing operation by the user and displays an image on based on the drawing operation by the user.

The information processing apparatus 10 is, for example, a so-called general purpose personal computer (PC). Then, the information processing apparatus 10 performs various application software under the control of an operating system (OS) to process information and the like.

The information processing apparatus 10 includes a central processing unit (CPU) which is a computing unit, and a main memory and a hard disk drive (HDD) which are storage units. Here, the CPU executes various software such as an operating system (OS (basic software)), and application program (application software). The main memory is a storage area for storing various software and data used for its execution, and the HDD is a storage area for storing input data for various software, output data from various software, and the like.

Furthermore, the information processing apparatus 10 includes a communication interface for communicating with the outside.

The display device 20 displays an image on a display screen 20a. Examples of the display device 20 include a liquid crystal display for a PC, a liquid crystal television, a projector, or the like having a function of displaying an image. Therefore, the display method in the display device 20 is not limited to the liquid crystal method, but may be an organic electro luminescence (EL) method, a plasma display method, or the like, for example.

The display screen 20a is, for example, a touch panel, which displays an image by the touch panel and receives an instruction of a user such as a touch. Therefore, the display screen 20a is provided with a position detection unit (not shown) that detects a position where a contact object touches the touch panel when the contact object represented by a stylus pen or a human finger touches the display screen 20a. The touch panel used as the display screen 20a in the present exemplary embodiment is not particularly limited, and various types such as a resistance film type and a capacitance type are adopted.

The information processing apparatus 10 and the display device 20 are connected through a digital visual interface (DVI). Instead of DVI, the information processing apparatus and the display device 20 may be connected through High-Definition Multimedia Interface (HDMI (registered trademark)), DisplayPort, a universal serial bus (USB), or the like.

Further, the connection is not limited to such a wired connection, but may be a wireless connection such as a wireless local area network (LAN), Bluetooth (registered trademark), or the like.

In such an information processing system 1, the user first performs a drawing operation on the display screen 20a of the display device 20 with a stylus pen or the like. The drawing operation is displayed as a trajectory on the display screen 20a. Information on the drawing operation is sent to the information processing apparatus 10 as drawing information. Then, the information processing apparatus 10 extracts a figure drawn by the user, based on the drawing information, and converts the figure into an object according to a predetermined rule. On the display screen 20a, this object is displayed. That is, the trajectory drawn by the user is deleted, and instead thereof, the object is displayed. Further, in the present exemplary embodiment, when the information processing apparatus 10 performs conversion into an object, it is possible to use sound information which is information of the sound uttered by the user as well. That is, the drawing information and the sound information are used to determine an object which is a product of conversion. Sound is not indispensable in this case, and there are cases where sound is not used.

Note that the information processing system 1 in the present exemplary embodiment is not limited to the configuration in FIG. 1. For example, a tablet terminal can be exemplified as the information processing system 1. In this case, the tablet terminal is provided with a touch panel, displays an image by the touch panel and receives an instruction of a user such as a touch. The process of performing conversion into an object can be performed by a computer device built in the tablet terminal. That is, the tablet terminal functions as the information processing apparatus 10 and the display device 20 described above. From the same viewpoint, the information processing system 1 may be a smartphone, a notebook PC, or the like.

Description of Information Processing Aparatus 10

Figure 2:
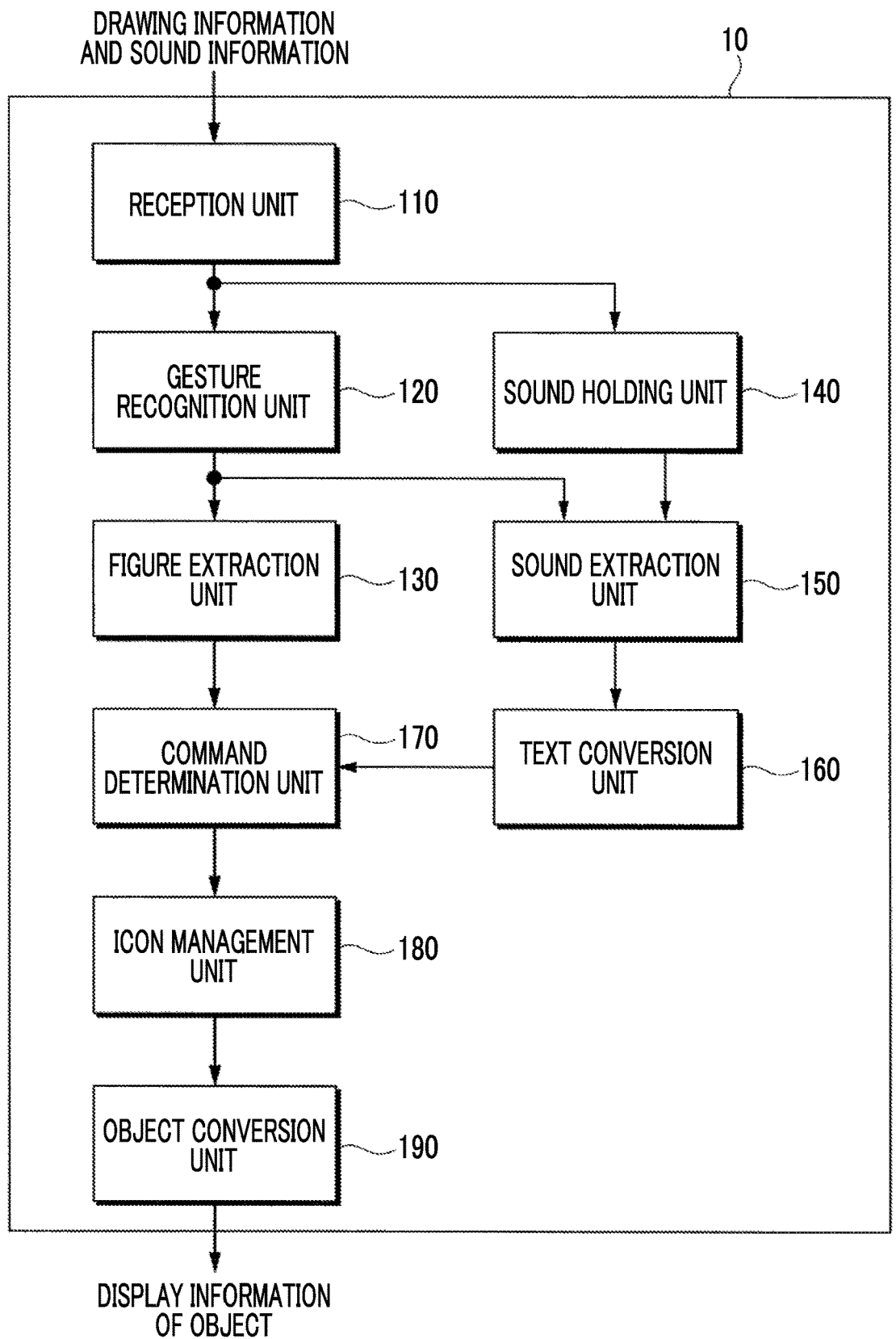
FIG. 2 is a block diagram illustrating an example of a functional configuration of an information processing apparatus according to the present exemplary embodiment.

FIG. 2 is a block diagram illustrating an example of a functional configuration of the information processing apparatus 10 according to the present exemplary embodiment. In FIG. 2, among the various functions of the information processing apparatus 10, those related to the present exemplary embodiment are selected and shown.

As illustrated, the information processing apparatus 10 of the present exemplary embodiment includes a reception unit 110 that receives drawing information which is information on the drawing operation of the user and sound information which is information on the user's sound, a gesture recognition unit 120 that recognizes a gesture which the user designates a command, a figure extraction unit 130 that extracts the type of the figure drawn by the user, a sound holding unit 140 that holds sound information, a sound extraction unit 150 that extracts sound information, a text conversion unit 160 that recognizes sound information as sound and converts the sound information into text information, a command determination unit 170 that determines whether or not the command is valid, an icon management unit 180 that searches for icons for converting the drawing information and the sound information into objects, and an object conversion unit 190 that converts the drawing information and sound information into objects.

The reception unit 110 receives drawing information which is information on a drawing operation by a user.

"Drawing operation" refers to an operation that the user performs an input to the display screen 20a which is a touch panel or the like, using a stylus pen or the like. "Drawing information" is information indicating the trajectory of a line drawn by the user on the display screen 20a. The drawing information is, for example, a collection of two-dimensional coordinate information indicating the position where the stylus pen or the like touched on the display screen 20a. In a case where the user performs a drawing operation with a stylus pen or the like, the position at which the stylus pen or the like touches the display screen 20a changes with time and what the user has drawn can be recognized by a change in the coordinate information. Therefore, the drawing information is configured as a group of plural pieces of two-dimensional coordinate information (coordinate information group).

Further, the reception unit 110 further receives sound information which is information on sound during the drawing operation by the user.

"Sound information" is information obtained by converting a user's sound acquired by a sound acquisition unit such as a microphone (not shown) into an electric signal (sound signal). Note that the sound information may be amplified by an amplifier such as an operational amplifier.

The gesture recognition unit 120 is an example of a recognition unit, and it recognizes that the last part of the drawing operation is a gesture which the user designates a command, based on the drawing information.

Here, the "command" means that the user gives an instruction to convert a drawing operation or sound into an object. "Object" is a product of conversion based on the drawing operation by the user, and is to be displayed on the display screen 20a. "Object" is an icon, a box, a text, or a link, for example, although it will be described later in detail. Further, "gesture" refers to an operation by the user to clearly indicate that it is a command.

At this time, when the user draws a predetermined shape, the gesture recognition unit 120 recognizes that it is a gesture for the user to designate a command. Recognition of gestures is performed from the drawing operation. Specifically, the gesture recognition unit 120 cuts a part of a predetermined length from the last place of the drawing operation performed by the user, and determines whether or not it is the gesture for the user to designate the command, based on the shape of the part.

Figure 3A:
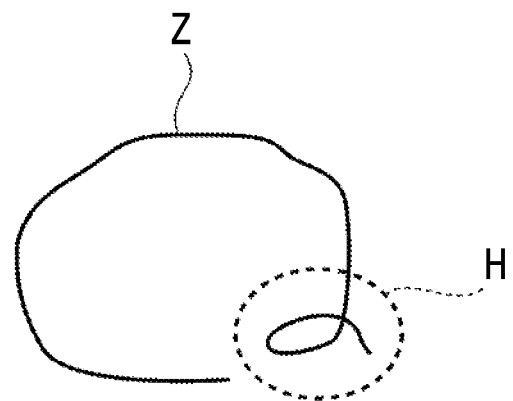
FIGS. 3A to 3C are diagrams each showing an example in which a predetermined shape is drawn as a gesture that a user designates a command.
Figure 3B:
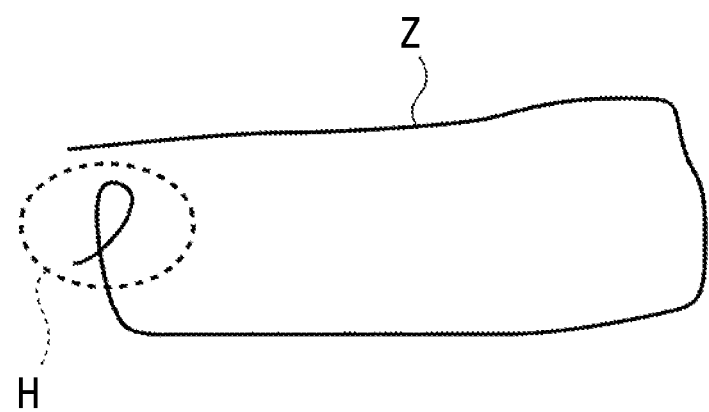
Figure 3C:
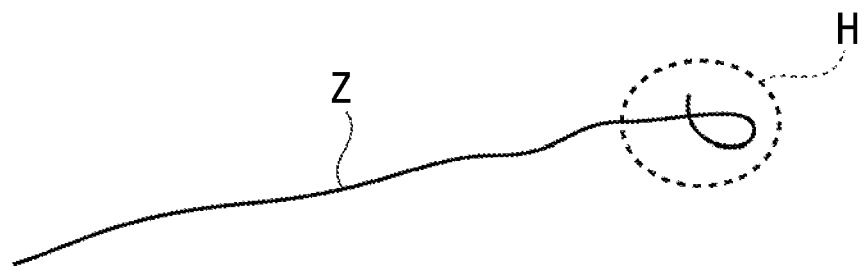

FIGS. 3A to 3C are diagrams each showing an example in which a predetermined shape is drawn as a gesture that a user designates a command.

In this case, a case is shown in which the user draws a certain figure Z and draws a predetermined shape representing a gesture at the last place after drawing the figure Z. The predetermined shape is a shape representing a closed space.

Among them, FIG. 3A shows an example in which the user draws a circle as the figure Z and draws a closed space H of a small circular shape at the last place in a clockwise direction.

In addition, FIG. 3B shows an example in which the user draws a rectangle as the figure Z and draws a similar closed space H at the last place. Further, FIG. 3C shows an example in which the user draws a straight line as the figure Z and draws a similar closed space H at the last place.

In a case where the predetermined shape is a shape representing the closed space H, there is an effect that the user can easily draw it.

In a case where the predetermined shape is a shape representing the closed space H, although not particularly limited, it is desirable to limit the size of the closed space H as exemplified in FIGS. 3A to 3C to a predetermined size or less. This makes it easy to distinguish it from the case of drawing a large closed space as the figure Z. The shape of the closed space H may be a shape customized according to the user's habit. Further, here, the closed space H is set to a small clockwise circular shape, but without being limited thereto, it may be counterclockwise circular shape or other shapes such as a triangle or a quadrangle. All of them may be handled as the closed space H. That is, after drawing a circle as the figure Z, the user tends to draw a circle, and after drawing a rectangle as the figure Z, the user tends to draw a rectangle. Therefore, by including all of these, user convenience is improved.

Further, when the user draws a predetermined shape, the gesture recognition unit 120 recognizes that it is a gesture which the user designates a command, but the present invention is not limited thereto. For example, a difference from when the figure Z is drawn may be detected by using the pressure or inclination of a stylus pen or the like. In the above-described example, recognition of a gesture is performed from the drawing operation, but it may be performed from operations other than the drawing operation by the user. For example, at the end of the drawing operation, an operation such as tapping with the hand opposite to the hand holding the stylus pen or the like, blowing out, changing the tone of the sound by the user may be detected and recognized as a gesture that the user designates a command.

The figure extraction unit 130 is an example of an extraction unit that extracts the type of the figure Z, and it extracts the type of the figure Z drawn by the user before the user performs the gesture. The type of the figure Z is extracted from the drawing operation, more specifically, from the drawing operation of one stroke drawing. Here, "one stroke drawing" refers to a drawing operation of one time (one stroke) that the user performs. That is, "one stroke drawing" is a drawing operation of one time (one stroke) that the user performs without releasing the stylus pen or the like from the display screen 20*a*. At this time, the figure extraction unit 130 regards the portion other than the drawing operation of the gesture as the figure Z. That is, in the case of FIGS. 3A to 3C as an example, the figure extraction unit 130 designates a portion other than a closed space H as the figure Z.

Then, the figure extraction unit 130 extracts the figure type as the type of the figure Z for the figure Z, and further determines the object type.

Here, "figure type" refers to the type of a figure derived from the shape of the figure Z. In the present exemplary embodiment, "figure type" is any one of three types of "circle", "rectangle", and "line". Further, "object type" refers to the type of an object which is a product of conversion by the object conversion unit 190, which will be described in detail later. In the present exemplary embodiment, "object type" is any one of four types of "icon", "box", "text", and "link". Among them, "icon" means that the object is an icon. "Box" means that the object is a rectangular frame. Further, "text" means that the object is a character string. Further, "link" means that the object is a line connecting the other two objects.

FIG. 4 is a diagram showing a case where the figure extraction unit 130 extracts a figure type of an extracted figure Z and further determines an object type.

Here, the first column illustrates drawing operations by the user, which is performed with the above-described one stroke. Here, as described above, the drawing operation includes the figure Z and the closed space H. The second column shows figure types. Further, the third column shows object types.

In the case of (a) of FIG. 4, the figure Z other than the closed space H is a large closed space composed of curved lines with no corners. In this case, the figure type is "circle". In a case where the figure type is "circle", the object type is "icon".

In the case of (b) of FIG. 4, the figure Z other than the closed space H is a large closed space composed of straight lines and corners. In this case, the figure type is "rectangle". In a case where the figure type is "rectangle", the object type is "box".

Further, in the case of (c) of FIG. 4, the figure Z other than the closed space H is formed of a straight line, and in this case the figure type is "line". In a case where the figure type is "line", the object type is either "link" or "text". Specifically, in a case where the start point and the endpoint of the figure Z are located in the positions of the other two objects, the line is "link", otherwise the line is "text".

In the example described above, the figure type is extracted by regarding parts other than the closed space H as the figure Z. However, the closed space H and the figure type may be extracted by regarding parts including the closed space H as the figure Z.

Further, the figure extraction unit 130 generates the object structure data OD.

Figure 5:
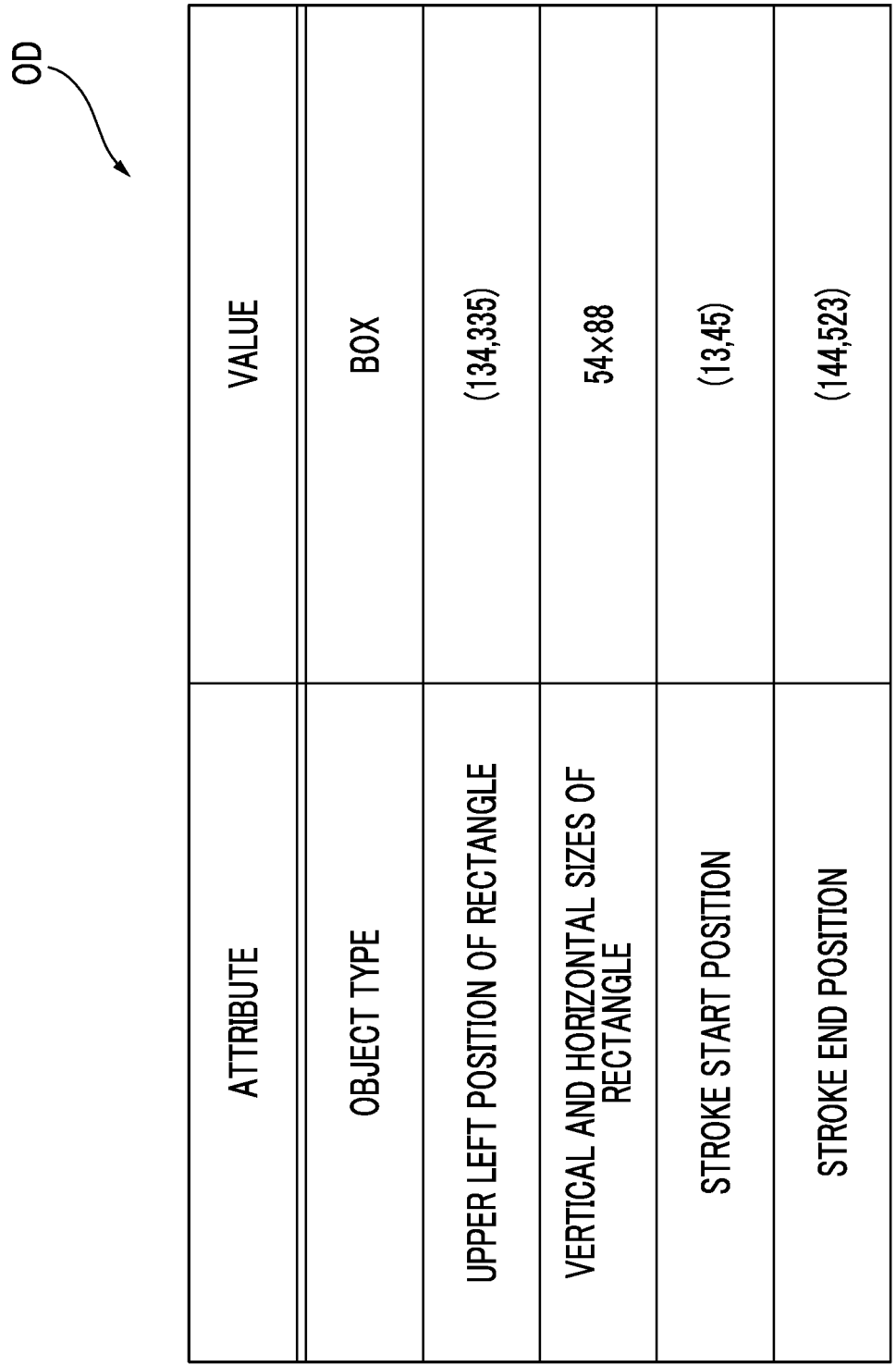
FIG. 5 is a diagram illustrating object structure data.

FIG. 5 is a diagram illustrating object structure data OD.

The illustrated object structure data OD has attributes and values shown in FIG. 5. These attributes include the object type, the upper left position of the rectangle, the vertical and horizontal sizes of the rectangle, the stroke start position, and the stroke end position. The value is a value corresponding to the attribute. Here, it means that the object type is a box and the upper left position of the rectangle having the minimum size as a rectangle capable of covering one stroke is the pixel position of (134, 335). Further, this means that the vertical and horizontal sizes of the rectangle are 54 dots (pixels)×88 dots, the stroke start position which is the start position of one stroke is the pixel position of (13, 45), and the stroke end position which is the end position of one stroke is the pixel position of (144, 523). However, all the attributes are not used, and for example, when the object type is a box, the stroke start position and the stroke end position are not used. Further, when the object type is a link or a text, the upper left position of the rectangle and the vertical and horizontal sizes of the rectangle are not used.

The sound holding unit 140 holds the sound information for a predetermined time. Further, the sound information is discarded after a predetermined time. That is, the sound holding unit 140 functions as a buffer for sound information.

The sound extraction unit 150 is an example of an extraction unit that extracts sound information, and it extracts target sound information to be converted into text information by the text conversion unit 160, from the sound information before and after the gesture.

FIG. 6 is a diagram showing a method of extracting sound information by a sound extraction unit 150. In FIG. 6, the horizontal direction is time, and the place where the sound information exists is indicated by a rectangle K.

The sound extraction unit 150 examines the sound information before and after the gesture, and detects interruption of sound. Then, the target sound information is specified by using the interruption of sound. The sound extraction unit 150 finds a time when sound information does not exist for a predetermined period of time or longer from the sound information held in the sound holding unit 140, and in this case, it is assumed that interruption of sound occurs. In the illustrated case, the user utters at the point of time when one stroke ends as the drawing operation of the user, that is, when the closed space H which is a gesture designating the command is drawn, and the sound extraction unit 150 detects places where the interruption of sound occurs before and after the point of time. Then, the places where the detected interruption of sound occurs are specified as the start position and the end position of the target sound information. The predetermined time for detecting the interruption may be variable. That is, in the case of a person (user) who speaks fast, the predetermined time is set shorter, and for a person who does not, it is set longer. Alternatively, when the user is speaking quickly, the predetermined time may be set shorter, and otherwise, it may be set longer.

When there is no sound information, the sound extraction unit 150 determines that there is no target sound information and does not perform extraction. The user may utter continuously and the start position and the end position may not be detected in some cases. In this case, the sound extraction unit 150 may perform language analysis to detect semantic separation, and extract the target sound information, for example. Further, the sound extraction unit 150 may detect the separation by intonation of the sound uttered by the user.

The text conversion unit 160 recognizes the sound information extracted by the sound extraction unit 150 as sound, and converts the sound information into text information which is sound text. As a module performing sound recognition, there is no particular limitation, and generally, a module that is commercially available can be used. When the target sound information is not extracted by the sound extraction unit 150, the text conversion unit 160 converts it into an empty character string.

The command determination unit 170 determines whether or not the object type T determined by the figure extraction unit 130 and the sound text S converted by the text conversion unit 160 are valid as commands.

Specifically, when the object type T is "icon" and there is an icon corresponding to the sound text S, the command determination unit 170 determines that it is valid as a command. On the other hand, in a case where there is no icon corresponding to the sound text S, it is determined that it is invalid as a command. In a case where the sound text S is an empty character string, the command determination unit 170 determines that it is invalid as a command.

Further, in a case where the object type T is "box", the command determination unit 170 determines that it is valid regardless of the sound text S.

Further, in a case where the object type T is "text" and the sound text S is not an empty character string, the command determination unit 170 determines that it is valid as a command. On the contrary, in a case where the sound text S is an empty character string, it is determined that it is invalid as a command.

Further, in a case where the object type T is "link", the command determination unit 170 determines that it is valid regardless of the sound text S.

The icon management unit 180 manages icons. Further, the icon management unit 180 searches for icons for converting drawing information and sound information into objects.

The icon management unit 180 manages icons using an icon table.

FIG. 7A is a diagram showing an icon table IT.

The illustrated icon table IT is configured with an icon ID in the first column, an icon path in the second column, and an icon name list in the third column. The icon ID is an ID assigned to the icon, and here, the case where the icon IDs are 1 and 2 is shown. The icon path represents the location of the file in which the image information of the icon is stored. Further, the icon name list is a mnemonic name of each icon. Here, the icon name list is made up of plural words.

When the object type T is "icon", the command determination unit 170 passes the sound text S to the icon management unit 180. Then, the icon management unit 180 searches for an icon including the sound text S in the icon name list. In a case where there is such an icon, the icon management unit 180 generates text structure data and returns it to the command determination unit 170. In a case where there is no such an icon, the icon management unit 180 returns that there is no corresponding icon, to the command determination unit 170.

FIG. 7B is a diagram showing the text structure data TD.

The illustrated text structure data TD includes attributes in the first column and values in the second column. The attribute in the first column includes the sound text and the icon ID, and "notebook PC" and "1" are indicated as the values in the second column, respectively. In other words, since the text structure data TD has the sound text S "notebook PC" and the icon name list of icon ID 1 contains the "notebook PC" as the sound text S, as shown in FIG. 7A, it is indicated that the text structure data TD having the icon ID "1" is generated.

Note that the text structure data TD may include plural icon IDs in some cases. That is, these are the cases where there are plural icon IDs corresponding to the sound text S. In this case, the icon management unit 180 calculates the similarity between the sound text S and the icon name list. Then, the icon ID with the highest similarity is returned to the command determination unit 170. Calculation of the similarity is not particularly limited, but it can be calculated by, for example, the number of matching of partial character string (E)/number of words of the icon name list (L). Weighing may be given to each word on the icon name list.

The object conversion unit 190 is an example of a processing unit and performs a process based on the extracted type of the figure. Further, the object conversion unit 190 performs a process based on the sound information in addition to the type of the figure.

In the present exemplary embodiment, the process performed by the object conversion unit 190 is a process of converting into an object corresponding to the type of figure. Specifically, the object conversion unit 190 determines an object based on the relationship between the type of figure and sound information.

FIGS. 8A to 8D are diagrams showing a process in which the object conversion unit 190 performs conversion into an object corresponding to the type of the figure. The column on the left side of the arrow shows the sound text and the drawing operation by the user. Further, the column on the right side of the arrow indicates the object which is produced by converting the drawing operation by the user.

As described above, in a case where the figure type which is the type of a figure is "circle", the object type is "icon". In this case, as shown in FIG. 8A, the object conversion unit 190 performs conversion into an icon meaning sound information as an object. That is, the object conversion unit 190 performs conversion into an icon corresponding to the sound text obtained by converting the sound information into text information. In this case, since the sound text is "desktop PC", the drawing operation performed by the user is converted into an object of the icon of the desktop PC.

Further, the object conversion unit 190 may perform conversion into a text that is meant by the sound information as an object, and dispose the text.

In a case where the figure type is "rectangle", the object type is "box". In this case, as shown in FIG. 8B, the object conversion unit 190 performs conversion such that the text meant by the sound information is present within the frame corresponding to the figure, as an object. That is, the object conversion unit 190 performs conversion such that the sound text is present within the rectangular frame. In this case, since the sound text is "N office", the drawing operation performed by the user is converted into an object containing the text "N office" within the rectangular frame. When the sound text is an empty character string, only the rectangular frame is displayed. In other words, when there is no sound information, the object conversion unit 190 performs conversion into a frame corresponding to the figure, as an object, and no text is present in the frame.

Further, in a case where the figure type is "line" and the object type is "text", as shown in FIG. 8C, the object conversion unit 190 deploys the text along the drawing direction of the drawing operation when the figure is drawn, as an object. In this case, since the sound text is "N office", the drawing operation is converted into an object of "N office" text along the line drawn by the user as a drawing operation.

Further, in a case where the figure type is "line" and the object type is "link", as shown in FIG. 8D, the object conversion unit 190 performs conversion into a link connecting two icons, as the object. In this case, along the line drawn by the user's drawing operation, conversion into an object of an arrow meaning a link is performed. In this case, the object representing the link is an arrow, but it can be a simple straight line.

The object conversion unit 190 determines the position and size of the object to be produced by conversion, using the object structure data OD generated by the figure extraction unit 130 and the text structure data TD generated by the icon management unit 180.

For example, with reference to the object structure data OD, in a case where the object type T is "icon", the object conversion unit 190 places the icon of the size of the values of the vertical and horizontal sizes of the rectangle at the position of the value of the upper left position of the rectangle.

For example, in a case where the object type T is "box", the object conversion unit 190 places a rectangular frame of the size of the values of the vertical and horizontal sizes of the rectangle at the position of the value of the upper left position of the rectangle and a sound text to be present in the frame.

Furthermore, in a case where the object type T is "text", the object conversion unit 190 causes the sound text to be disposed on a straight line connecting the stroke start position and the stroke end position.

Further, in a case where the object type T is "link", the object conversion unit 190 causes the arrow connecting a different object located at the stroke start position and a different object located at the stroke end position to be disposed.

In other words, in this case, the object conversion unit 190 determines the position to dispose the object and the size thereof, according to the position at which the figure is drawn and the size of the figure. After disposing the object, its position and size may be changed. In this case, the user does not need to accurately draw the figure of the size at the position, and the convenience of the user is improved.

Description of Operation of Information Processing Apparatus 10

Next, the operation of the information processing apparatus 10 will be described.

Figure 9:
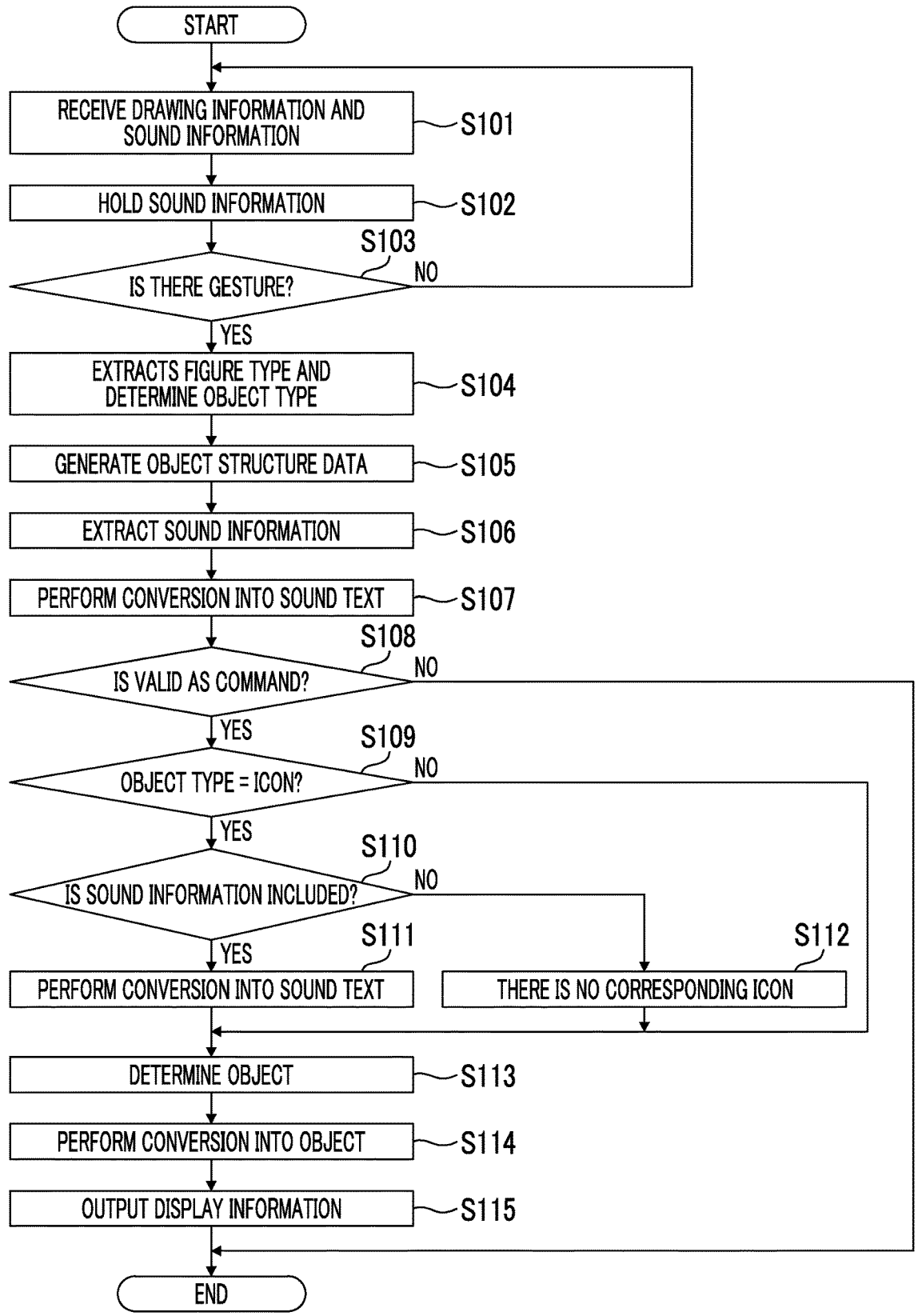
FIG. 9 is a flowchart for explaining an operation of the information processing apparatus.

FIG. 9 is a flowchart for explaining an operation of the information processing apparatus 10.

First, the reception unit 110 receives drawing information which is information on the drawing operation of the user and sound information which is information on the sound of the user (step 101). The acquired sound information is held by the sound holding unit 140 for a predetermined time (step 102).

Next, the gesture recognition unit 120 determines whether or not the user has performed a gesture designating a command (step 103). This can be determined based on whether or not the closed space H or the like described above is drawn at the last part, when the drawing operation of one stroke by the user is completed.

As a result, in a case where a gesture is not performed (No in step 103), the process returns to step 101.

On the other hand, in a case where the gesture is performed (Yes in step 103), the figure extraction unit 130 extracts the type of the figure drawn by the user and further determines the object type (step 104), as shown in FIG. 4. Further, the figure extraction unit 130 generates the object structure data OD shown in FIG. 5 (step 105).

Next, the sound extraction unit 150 extracts sound information (step 106). As shown in FIG. 6, from the sound information held in the sound holding unit 140, the target sound information to be converted into text information is specified by using the interruption of sound.

Then, the text conversion unit 160 converts the sound information extracted by the sound extraction unit 150 into sound text which is text information subjected to sound recognition (step 107).

Next, the command determination unit 170 determines whether or not these are valid as commands, based on the object type determined by the figure extraction unit 130 and the sound text converted by the text conversion unit 160 (step 108).

As a result, in a case where these are not valid (invalid) (No in step 108), the series of processes is terminated.

On the other hand, in a case where these are valid (Yes in step 108), the command determination unit 170 determines whether or not the object type is an icon (step 109).

As a result, in a case where the object type is not an icon (No in step 109), the process proceeds to step 113.

On the other hand, in a case where the object type is an icon (Yes in step 109), the icon management unit 180 refers to the icon table shown in FIG. 7A and determines whether or not there is an icon including a sound text in the icon name list (step 110).

In a case where there is such an icon (Yes in step 110), the icon management unit 180 generates text structure data shown in FIG. 7B and returns it to the command determination unit 170 (step 111).

In a case where there is no such an icon (No in step 110), the icon management unit 180 returns that there is no corresponding icon, to the command determination unit 170 (step 112).

Then, as shown in FIGS. 8A to 8D, the object conversion unit 190 determines an object based on the relationship between the type of figure and sound information (step 113).

Further, the object conversion unit 190 converts the drawing information into an object (step 114).

Then, the object conversion unit 190 outputs the display information of the object to the display device 20 (step 115).

Thus, on the display device 20, the drawing operation by the user is deleted and the object which is a production of conversion is displayed.

Figure 10:
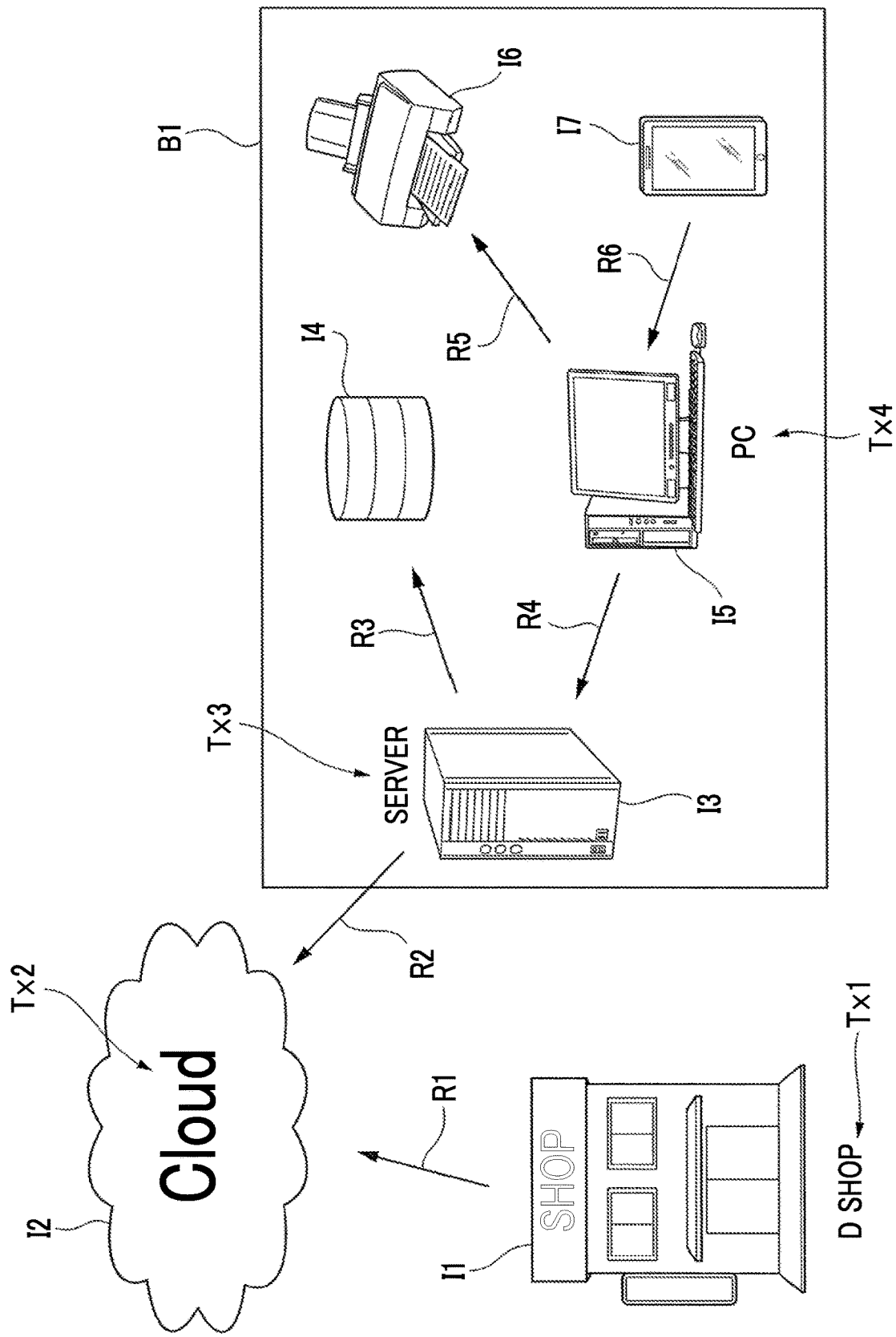
FIG. 10 is a diagram showing an example of a screen displayed on a display device when a drawing operation by the user is converted into an object.

FIG. 10 is a diagram showing an example of a screen displayed on the display device 20 when a drawing operation by a user is converted into an object.

The illustrated example shows a cloud service. Icons I1 to I7, a box B1, texts Tx1 to Tx4, and links R1 to R6 are shown as objects.

Here, the link R1 indicates that the data is uploaded from the D shop which is represented by the shop icon I1 and the text Tx1 of the "D shop" to cloud which is represented by the cloud icon 12 attached with the text Tx2 "Cloud".

On the other hand, the link R2 indicates that the data is uploaded from the server represented by the server icon 13 attached with the text "Tx3" of "server". Further, from this server, the link R3 indicates that data is stored in the HDD represented by the HDD icon 14.

Further, the link R4 indicates that the data is sent from the PC represented by the PC icon 15 attached with the text "Tx4" of "PC" to a server. From the PC, the link R5 indicates that data is sent to the printer represented by the printer icon 16.

Further, the link R6 indicates that data is sent from the smartphone represented by the smartphone icon I7 to the PC. The server, the HDD, the PC, the printer, and the smartphone are included in the box B1 and indicate, for example, that they are in one company.

Explanation of Effect

In the related art, in a case where a user inputs a command by combining plural input units such as a pointing device such as a pen or a mouse, it is not supposed to be done during presentation, for example. Therefore, for example, sound becomes a state (command mode) in which a command is always received. However, during the presentation, for example, in the case where the same display screen 20a is shared with the other party and discussion or the like is performed while doing indicating, there is an operation not intended by the user (unintentional insertion of the object, unintentional movement of the object, or the like), which makes usability inconvenient.

In order to suppress this, it is conceivable to designate the command mode. However, in a case of designating the command mode by a pointing device or the like, in the related art, it is necessary to designate the start and the end thereof at the time of drawing, and there is a problem that the work efficiency tends to be lowered. This operation also has a problem that it is easy to disturb the smooth flow of presentation and discussion. Further, in a case of drawing something, the user needs to always be conscious of whether it is drawing or uttering in the command mode, and there is also a problem that the burden on the user is great.

In this case, although it is difficult to perform an operation to enter the command mode before drawing or uttering, it is relatively easy to designate that it has been in the command mode so far, after drawing or uttering. Further, designating this by sound makes it necessary to make an utterance unrelated to this in the presentation, which makes it easy to disturb communication. Therefore, in the present exemplary embodiment, designation of the command mode is performed at the end of the drawing operation, and this is performed with a predetermined gesture. Then, from the time of performing this gesture, the command is recognized by analyzing the drawing operation and the sound backward in time. For sound, it is not indispensable, and commands may be recognized only by a drawing operation.

Figure 11A:
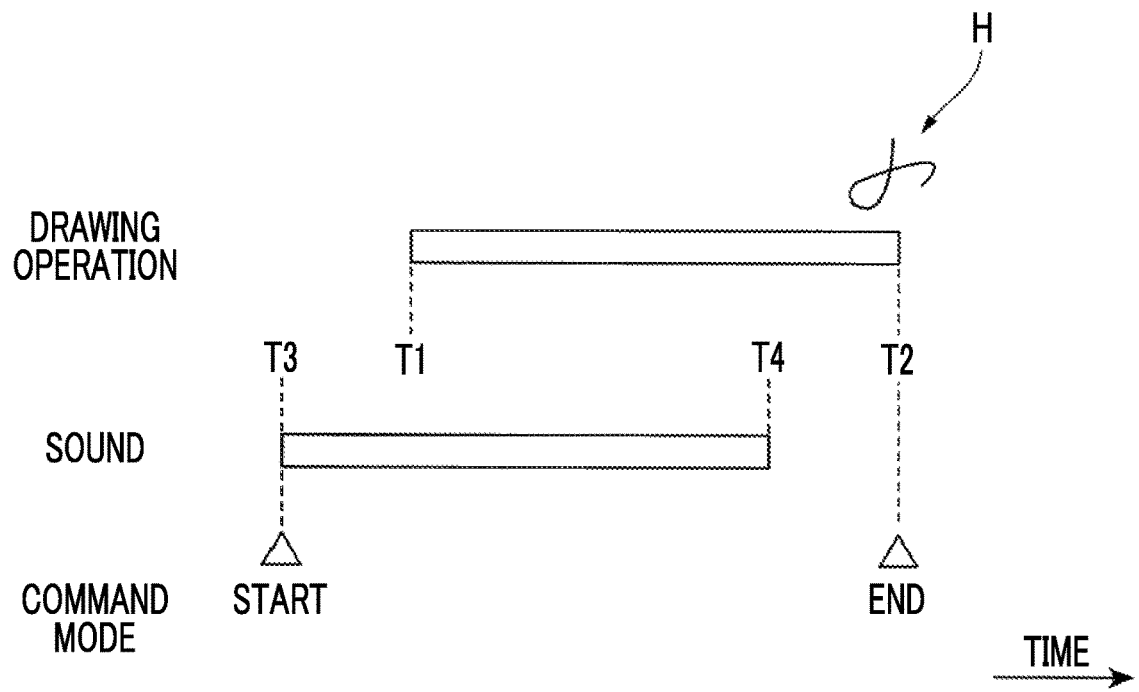
FIGS. 11A and 11B are diagrams showing a method of determining the start and end of a command mode in the present exemplary embodiment.
Figure 11B:
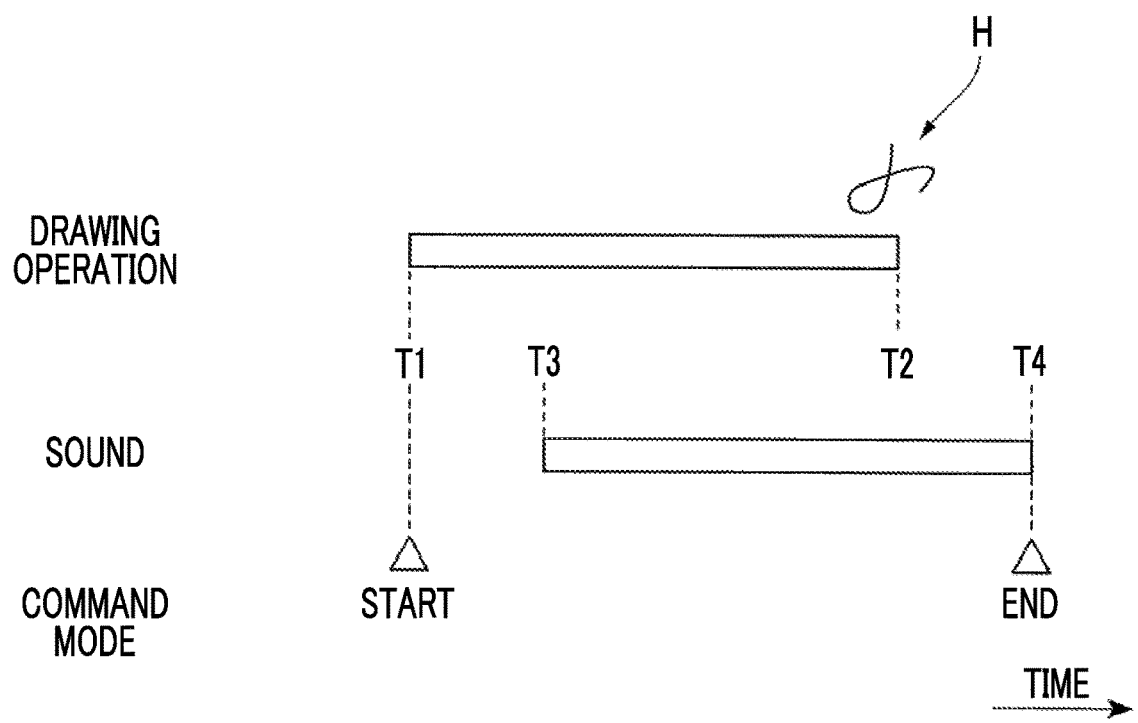

FIGS. 11A and 11B are diagrams showing a method of determining the start and end of a command mode in the present exemplary embodiment. Here, the horizontal direction represents time, and it is indicated that a drawing operation is performed between time T1 and time T2, and the user utters and there is sound of the user from time T3 to time T4.

Among them, FIG. 11A shows a case where the user's utterance ends and there is no sound at the time when the drawing operation of the user is ended, that is, at the time of drawing the closed space H which is a gesture designating the command, and FIG. 11B shows a case where the user's utterance has not ended yet at this point and the sound continues.

In either case, the start and end of the command mode by using interruption of the drawing operation (a period when the drawing is not performed before and after one stroke) or interruption of sound. That is, in the case of FIG. 11A, it is assumed that a period between the time T3 which is the start time of the sound and the time T2 which is the end time of the drawing operation is the period of the command mode. Further, in the case of FIG. 11B, it is assumed that a period between the time T11 which is the start time of the drawing operation and the time T4 which is the end time of the sound is the period of the command mode.

In this way, according to the present exemplary embodiment, in a case where the designation of the command mode is performed at the end of the drawing operation, based on the designation, the start and end of the command mode can be determined using the drawing operation or the interruption of sound.

As described above, according to the present exemplary embodiment, it is possible to provide the information processing apparatus 10 or the like in which it is possible to easily input the command in a case of inputting the command, it is difficult to disturb the communication, there is no need to designate the start, and the work efficiency is unlikely to be lowered.

In the example described above, the case where the information processing apparatus 10 of the present exemplary embodiment is used in a case of performing a presentation has been described, but the present invention is not limited thereto. For example, it can be used for educational purposes.

In the above-described example, the case of one stroke is described as a drawing operation, but the present invention is not limited thereto, and the gestures and types of figures may be extracted from two or more strokes.

Explanation of Program

Here, the process performed by the information processing apparatus 10 in the present exemplary embodiment described above is prepared as a program such as application software.

Therefore, the process performed by the information processing apparatus 10 in the present exemplary embodiment can be regarded as a program causing a computer to implement a reception function of receiving drawing information which is information on a drawing operation by a user, a recognition function of recognizing whether or not a last part of the drawing operation is a gesture that the user designates a command, based on the drawing information, an extraction function of extracting a type of a figure drawn by the user before the user performs the gesture, and a processing function of performing a process based on the extracted type of the figure.

Further, the program realizing the present exemplary embodiment can be provided not only by a communication unit but also by being stored in a recording medium such as a CD-ROM.

Although the present exemplary embodiment has been described above, the technical scope of the present invention is not limited to the scope described in the above exemplary embodiment. It is obvious from the description of the scope of the claims that various modifications or improvements to the above exemplary embodiment are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor that receives drawing information which is information on a drawing operation by a user, and
    recognizes whether or not a last part of the drawing operation is a gesture which the user designates a command, based on the drawing information, and
    extracts a type of a figure drawn by the user before the user performs the gesture, and
    performs a process based on the extracted type of the figure,
    wherein the processor further receives sound information which is information on sound during the drawing operation by the user,
    performs the process based on the sound information in addition to the type of the figure before and after the gesture, and
    specifies target sound information to be processed by utilizing interruption of sound,
    wherein the processor identifies the target sound information from the sound information received by the processor during the drawing operation by the user, and the target sound information is identified from the sound information by utilizing interruption of sound in the sound information.

2. The information processing apparatus according to claim 1,
    wherein the processor performs a process of performing conversion into an object corresponding to the type of the figure.

3. The information processing apparatus according to claim 2,
    wherein the processor determines the object from a relationship between the type of the figure and the sound information.

4. The information processing apparatus according to claim 3,
    wherein the processor performs conversion into an icon meant by the sound information, as the object.

5. The information processing apparatus according to claim 3,
    wherein the processor performs conversion into a link connecting two icons, as the object.

6. The information processing apparatus according to claim 3,
    wherein the processor performs conversion into a text that is meant by the sound information, as the object, and disposes the text.

7. The information processing apparatus according to claim 6,
    wherein the processor performs conversion such that a text meant by the sound information is present within a frame corresponding to the figure, as the object.

8. The information processing apparatus according to claim 6,
    wherein, when sound information is not present, the processor performs conversion into a frame corresponding to the figure, as an object, and no text is present in the frame.

9. The information processing apparatus according to claim 6,
    wherein the processor disposes the text as the object along a drawing direction of a drawing operation when drawing the figure.

10. The information processing apparatus according to claim 2,
    wherein the processor determines a position to dispose the object and a size thereof, according to a position at which the figure is drawn and a size of the figure.

11. The information processing apparatus according to claim 1,
    wherein when the user draws a predetermined shape, the processor recognizes that the drawing operation is the gesture.

12. The information processing apparatus according to claim 11,
    wherein the predetermined shape is a shape representing a closed space.

13. The information processing apparatus according to claim 12,
    wherein the processor recognizes a shape representing a closed space having a size equal to or smaller than a predetermined size as the gesture.

14. The information processing apparatus according to claim 1,
    wherein recognition of the gesture and extraction of a type of the figure performed by the processor are performed from a drawing operation.

15. The information processing apparatus according to claim 14,
    wherein recognition of the gesture and extraction of a type of the figure performed by the processor are performed from a drawing operation of a one stroke drawing.

16. The information processing apparatus according to claim 15,
    wherein the processor regards a part other than the drawing operation of the gesture as the figure.

17. An information processing system comprising:
    a display device that displays an image based on a drawing operation by a user; and an information processing apparatus that generates display information of an image to be displayed on the display device based on the drawing operation,
wherein the information processing apparatus includes
a processor that receives drawing information which is information on a drawing operation by a user,
recognizes whether or not a last part of the drawing operation is a gesture which the user designates a command, based on the drawing information,
extracts a type of a figure drawn by the user before the user performs the gesture, and
performs a process based on the extracted type of the figure,
wherein the processor further receives sound information which is information on sound during the drawing operation by the user,
performs the process based on the sound information in addition to the type of the figure before and after the gesture, and
specifies target sound information to be processed by utilizing interruption of sound,
wherein the processor identifies the target sound information from the sound information received by the processor during the drawing operation by the user, and the target sound information is identified from the sound information by utilizing interruption of sound in the sound information.

18. A non-transitory computer readable medium storing program causing a computer to execute a process, the process comprising:
receiving drawing information which is information by a processor on a drawing operation by a user;
recognizing whether or not a last part of the drawing operation is a gesture which the user designates a command by the processor, based on the drawing information;
extracting a type of a figure drawn by the user before the user performs the gesture by the processor;
performing a process based on the extracted type of the figure by the processor;
receiving sound information which is information on sound by the processor during the drawing operation by the user;
performing the process based on the sound information in addition to the type of the figure before and after the gesture by the processor; and
specifying target sound information to be processed by utilizing interruption of sound by the processor,
wherein the processor identifies the target sound information from the sound information received by the processor during the drawing operation by the user, and the target sound information is identified from the sound information by utilizing interruption of sound in the sound information.

* * * * *